Patented May 30, 1939

2,160,159

UNITED STATES PATENT OFFICE 2,160,159

CHEESE PRODUCT AND PROCESS OF MANUFACTURE

Erik Lundstedt, Goshen, and Joel Taub, Brooklyn, N. Y., assignors to Newark Cheese Co., Inc., a corporation of New York No Drawing. Application September 24, 1937, Serial No. 165,484

11 Claims. (Cl. 99—117)

The present invention relates to improvements in the process of making uncured, soft cheese of low fat content, and particularly to a process of making a cottage cheese of extended life.

Cottage cheese ordinarily found on the market has a short saleable life due mainly to the conditions surrounding its manufacture. This cheese, as presently made, has a high moisture content, about 72% and over, and is difficult to guard against contamination. For this reason the consumer finds difficulty in securing a fresh and palatable product at all times.

Attempts have been made in the cheese industry to pasteurize or heat-preserve the finished cottage cheese, but without any measure of success. The resulting cheese from these attempts has invariably been grainy or tough, soupy and sour, and of no saleable value.

The present invention overcomes the foregoing difficulties and enables the manufacture of a new type of uncured, soft, low-fat cheese of the cottage cheese variety. This new cheese is a smooth, creamy-looking product with excellent keeping qualities, and one which possesses the fresh fine curd flavor associated with a newly made farmer cheese or well creamed cottage cheese. By means of the present process, cottage cheese can be heated to a smooth, plastic mass capable of being poured into containers. These containers can be sealed while the cheese mass is still hot, thus reducing contamination to a minimum.

In practicing the process of making cottage cheese according to the invention, the skim milk to be converted into cheese has a slight percentage of butter fat added to it to bring the total content of fat in the milk to approximately 1% to 4%. From an economic point of view, it is preferred that the total fat content in the milk be brought to about 1%. This fat is added prior to coagulation of the skim milk and is the first step in the process of manufacture. It is preferred that fat in the form of finely dispersed or homogenized 20% cream be used so that the fat particles will be embedded inside the later resulting curd, in order to form a smooth product. This step in the process facilitates the heating of the cottage cheese during the subsequent fusion or emulsification.

When the skim milk has thus been treated by the introduction of a slight percentage of fat, the milk is then cultured to a rather soft coagulum. The acid produced by the bacterial is kept to a minimum which will still permit the production of cottage cheese. This is determined by inspection of the coagulated milk which must be just firm enough to be cut and handled. At this point it is important not to permit the acid to go so high as to leach out from the curd whey soluble minerals which are of importance to any heat preserved cheese.

The coagulum is now cut and the curd thus obtained is treated, in accordance with known methods, by heating and drainage to reduce its moisture content below that of cottage cheese normally appearing on the market. In the practice of this step in the process, the cut coagulum is highly heated over a period of time, then drained, and the resulting curd washed and chilled in order to produce a dry smooth curd containing on the average less than 72% of moisture on the fat free basis. If desired, the usual methods of pressing the curds may now be employed to aid in further reducing the moisture content to the desired quantity. The standardization of the moisture content of cottage cheese is generally effected by the feel of the hand and by the appearance of the cheese.

Inasmuch as milk varies in composition, no general rule can be laid down in this step of the process other than to say that anyone skilled in the art will know how to make a dry smooth curd from the product of the previous steps. Variations in the degree of dryness of the curd can, of course, be achieved by carying the heating temperatures and the heating time.

Having prepared a dry, smooth curd, a binder is added to the cheese with or without suitable materials for flavoring purposes. These materials may be other cheeses, cream, salt and condiments. Of the known binders acceptable in food products, including starches, it is preferred to use locust bean gum; for example, one-half of one percent by weight on the blend. This particular water binder has been found to be extremely satisfactory in maintaining the desired body in the cheese mass. The water binder makes the mass act as though the moisture content were less, and aids in the fusion or emulsification of the finished cheese under heat treatment.

The resulting mass of cheese, water binder, salt, etc., is now thoroughly mixed in the cold and then transferred to a suitable receptacle where the mass is heated and stirred to a temperature sufficiently high to insure complete pasteurization and high enough to produce a free flowing mass. Prior to this heating and stirring, the water binding capacity of the cheese mass is regulated so that upon its subsequent heating it retains its plasticity during the entire heating period. The internal friction of the mass is such that it at all times enables the stirring device to stretch and pull the plastic cheese mass, a condition necessary for the emulsification by friction of the fat under heat treatment.

The resulting plastic mass of free flowing cheese is now poured into suitable containers which seal the cheese mass against contamination. These containers may be of suitable size to be sold in stores like other cheese products. The cheese will thus appear on the market in a practically sterile condition.

We have found, by way of example only, that an uncured cheese made in accordance with the process of the invention and standardized with extra cream to give a final cheese with 10% fat, required a temperature of 175° F. to produce a cheese whose keeping qualities compared very favorably with known types of processed cheeses of the cured variety.

It will be recognized by those skilled in the art that the present process introduces a new type of cheese or cheese product on the market, namely an uncured, heat-preserved, low fat, acid type (in contradistinction to rennet type) cheese which is relatively inexpensive to manufacture.

What is claimed is:

1. The process of making a pasteurized uncured soft cheese of the acid type, low fat content variety, which comprises introducing a slight percentage of butter fat in skimmed milk, forming therefrom a rather soft coagulum of minimum acidity that will allow cutting and handling of the curd, separating the curd from the whey to produce a relatively dry and smooth curd, adding a water binder, mixing the resulting mass and pasteurizing to form a plastic, free flowing mass.

2. The process of making a pasteurized unripened soft cheese of the acid type, low fat content variety, which comprises introducing approximately 1% of butter fat in skimmed milk, forming therefrom a rather soft coagulum of minimum acidity that will allow cutting and handling of the curd, separating the curd from the whey to produce a relatively dry and smooth curd containing less than 72% of moisture on the fat free basis, adding a small percentage of a water binder, mixing the resulting mass in the cold, and heating and stirring the cheese mass to produce a pasteurized, smooth, plastic, free flowing mass.

3. The process of making a pasteurized unripened soft cheese of the acid type, low fat content variety, which comprises introducing approximately 1% of butter fat in skimmed milk, forming therefrom a rather soft coagulum of minimum acidity that will allow cutting and handling of the curd, separating the curd from the whey to produce a relatively dry and smooth curd containing less than 72% of moisture on the fat free basis, adding flavoring materials and one-half of one percent by weight of locust bean gum, mixing the resulting mass in the cold, and heating and stirring the cheese mass to produce a pasteurized, smooth, plastic, free flowing mass.

4. The process of making pasteurized cottage cheese which comprises adding to skimmed milk a slight percentage of butter fat prior to its coagulation, culturing the milk to produce a rather soft coagulum having a minimum of acidity yet which will still produce cottage cheese, treating the resulting coagulum by heating and draining to reduce the moisture content of the curd to less than 72% on the fat free basis, whereby a relatively dry and smooth curd results, adding an extremely small percentage by weight of a water binder, mixing the resulting mass in the cold, and heating and stirring the mass to produce a pasteurized, smooth, plastic mass which can be poured.

5. In the process of making a pasturized uncured soft cheese of the acid type, low fat content variety, the steps which consist in adding to skimmed milk before converting the milk into curds a small percentage of butter fat, forming therefrom a soft coagulum of substantially minimum acidity to allow forming a curd, producing therefrom a relatively dry curd, adding a small percentage of a water binder, and subsequently pasteurizing the resulting cheese mass.

6. In the process of making a pasteurized uncured soft cheese of the acid type, low fat content variety, the steps which consist in adding to skimmed milk before converting the milk into curds a small percentage of butter fat in the form of homogenized cream, forming therefrom a soft coagulum of substantially minimum acidity to allow forming a curd, treating the same to produce a relatively dry curd, adding a small percentage of water binder, and subsequently pasteurizing the resulting cheese mass.

7. In the process of making a pasteurized uncured soft cheese of the acid type, low fat content variety, the steps which include adding to skimmed milk approximately one percent of butter fat, forming the milk thus treated into a rather soft coagulum having the minimum of acidity necessary to produce the cheese, separating the whey from the curd to obtain a relatively dry and smooth curd, and adding a small percentage by weight of a water binder, and pasteurizing the resulting cheese mass.

8. A new article of manufacture comprising a smooth, uncured, soft cheese of low fat and low acid content, said cheese containing an extremely small percentage by weight of a water binder and being pasteurized.

9. A new article of manufacture comprising a creamed cottage cheese of low fat and low acid content, said cheese having a moisture content below 72% on the fat free basis and being pasteurized.

10. A new article of manufacture comprising a smooth, uncured, soft cheese of low fat and low acid content, said cheese containing condiments and an extremely small percentage by weight of a water binder and being pasteurized.

11. The process of making a pasteurized, uncured soft cheese of the acid type, low fat content variety, which comprises forming from skimmed milk a rather soft coagulum of minimum acidity yet which will still produce cottage cheese, separating the curd from the whey to make it relatively dry and smooth, adding a water binder and cream, miving the resulting mass and pasteurizing to form a plastic, free flowing mass.

ERIK LUNDSTEDT.
JOEL TAUB.